May 6, 1952           A. H. HAWES           2,596,074
APPARATUS FOR COATING SURFACES WITH PLASTIC
AND OTHER SEMILIQUID COMPOSITIONS
Filed Feb. 20, 1948           5 Sheets-Sheet 1

INVENTOR
Albert Henry Hawes
BY Lucke & Lucke
AGENTS.

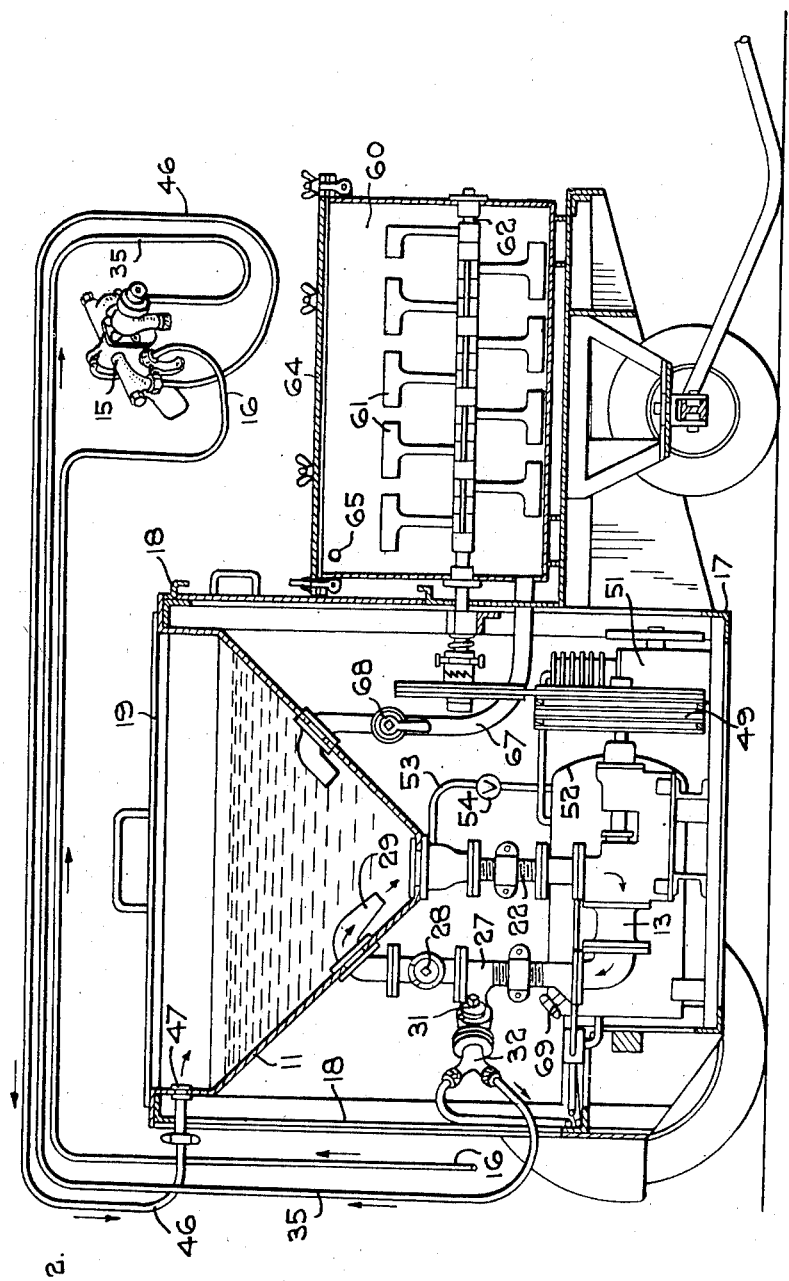

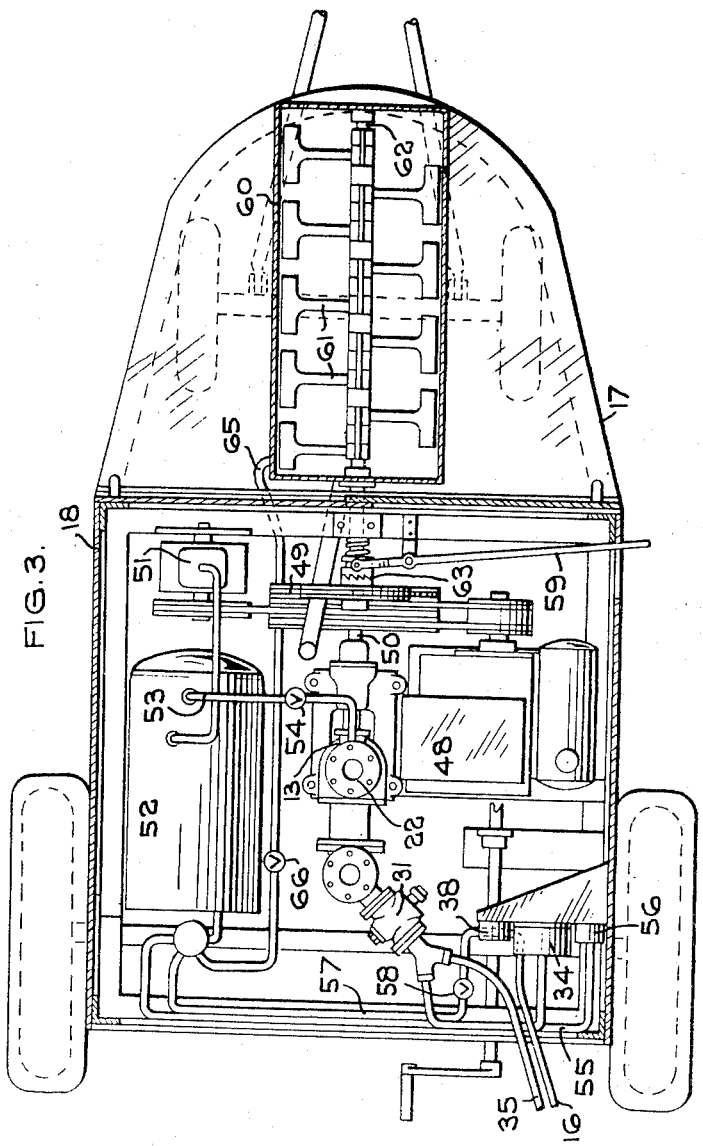

May 6, 1952     A. H. HAWES     2,596,074
APPARATUS FOR COATING SURFACES WITH PLASTIC
AND OTHER SEMILIQUID COMPOSITIONS
Filed Feb. 20, 1948     5 Sheets-Sheet 4

INVENTOR
Albert Henry Hawes
Lucke & Lucke
BY
AGENTS.

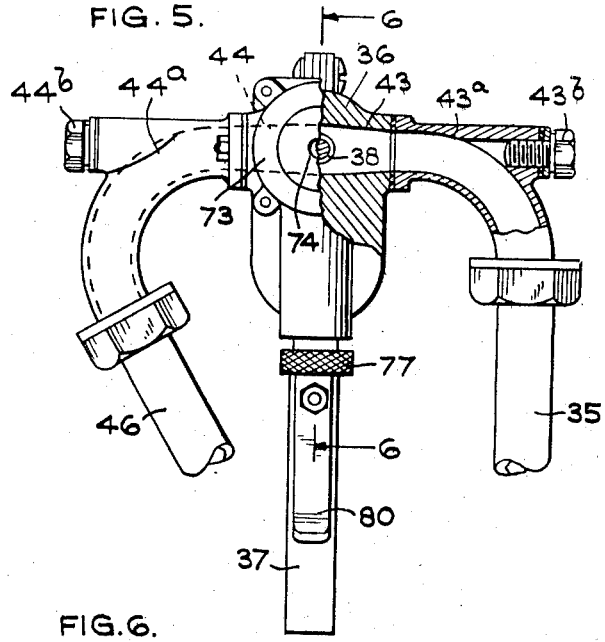
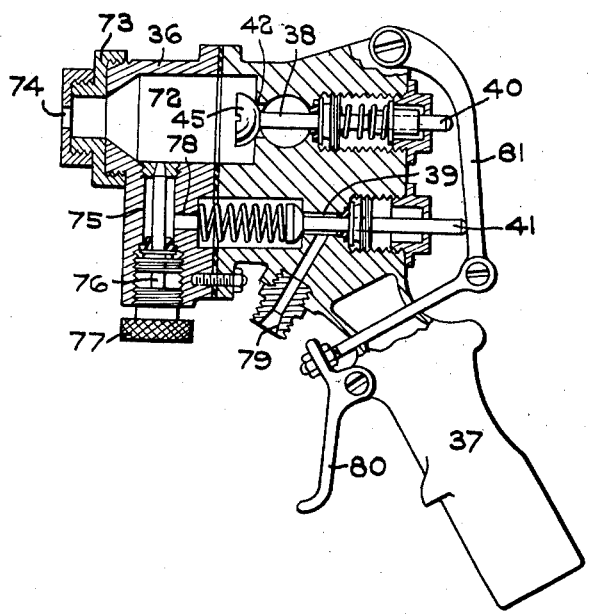

Patented May 6, 1952

2,596,074

UNITED STATES PATENT OFFICE 2,596,074

APPARATUS FOR COATING SURFACES WITH PLASTIC AND OTHER SEMILIQUID COMPOSITIONS

Albert Henry Hawes, Erdington, Birmingham, England, assignor to Kwikform Limited, Small Heath, Birmingham, England Application February 20, 1948, Serial No. 9,744
In Great Britain July 28, 1945

6 Claims. (Cl. 299—58)

This invention relates to a new or improved apparatus for coating surfaces with plastic and other semi-liquid compositions, and is intended for application to a particular kind of such coating compositions, namely, relatively thick cement, mortar or plaster slurries, all of which compositions contain comminuted solid matter in suspension in or otherwise mixed with a liquid vehicle, which matter readily settles out of the liquid, thereby causing clogging of the passages through which the composition may be flowing.

The invention is particularly applicable to the coating of the exterior walls of buildings with rough cast as well as to the rough plastering of interior walls, operations which have previously been effected either by hand application of the composition or by means of a hand-operated device.

It is well known to spray paint under pressure by using an atomizing nozzle to which a liquid readily flowing paint is supplied through a suitable supply tube, one end of the tube being connected to a container for the paint which is supplied along the tube under pressure to the other end which is connected to the atomizer nozzle.

Such a method is, however, wholly unapplicable to the coating of surfaces with compositions of the kind above specified, as the supply tube to the nozzle would very soon become choked.

The object of this invention is to provide a new or improved apparatus whereby cement, mortar and ordinary plaster, may be applied to surfaces much more rapidly and with greater ease and more evenly than has been possible heretofore, while at the same time, as compared with the hand-operated method above referred to, a considerable saving in cost is effected.

A further object of this invention is to provide apparatus as aforesaid which is especially applicable in the finishing of the walls of buildings, whereby the building of houses and the like is facilitated.

Referring to the drawings:

Figure 2 is a longitudinal sectional view of the same construction.

Figure 3 is a part sectional plan view.

Figure 5 is a part sectional front view depicting one form of spraying apparatus for applying the composition to the surface to be coated.

Figure 6 is a sectional view on the line 6—6 of Figure 5.

Figure 7:
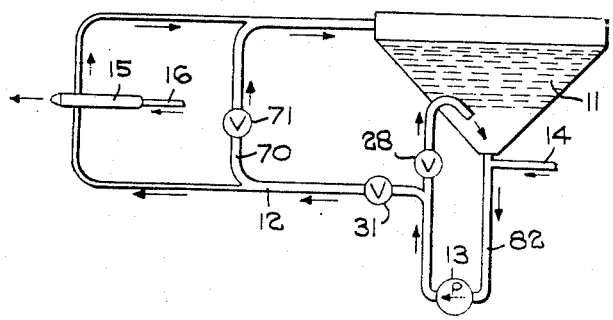
Figure 7 is a view illustrating diagrammatically the layout of the feeding and mixing circuits.

One simple form of apparatus for carrying the invention into effect is illustrated diagrammatically in Figure 7 of the drawings which shows a container 11 for the composition, such container forming one part of a closed mixing circuit 82, a pump 13 which serves to circulate the constituents continuously around the closed mixing circuit and by virtue of their passage through the container 11 to cause the contents of same to become thoroughly mixed, means indicated at 14 for supplying air or other gas under pressure into the mixing circuit 82, thereby assisting in maintaining proper mixture of the composition within said circuit, a closed feeding circuit 12 connected to the mixing circuit at positions spaced around the mixing circuit so that part of the latter forms part also of the feeding circuit, valves indicated at 18 and 31 for directing a predetermined proportion of the composition into the feeding circuit 12 around which the mixed material is continuously circulated by the pump 13, and apparatus 15 included in the closed circuit for applying the mixture directly from said circuit onto the surface to be coated.

Conveniently such apparatus comprises in practice an atomizer or spray gun to which the usual tube connection for air under pressure is indicated diagrammatically at 16. The length of the mixing circuit is substantially less than that of the feeding circuit as is indicated diagrammatically in Figure 7.

In Figure 7 there is depicted a by-pass indicated at 70. This is not in any way essential to the invention so that its function will be described in a later part of the specification.

One preferred apparatus for carrying the invention into practice is shown in Figures 1 to 6 of the drawings, such apparatus being intended for use in coating building walls with plaster comprising a suspension of cement and sand in water. In this apparatus the various parts, with the exception of the spray gun 15, are mounted upon a wheeled chassis 17 so as to permit of ready transportation, the chassis carrying a rectangular sheet metal body 18, in the upper part of which is housed the container 11 which is of conical form and provided with a removable lid 19.

Figure 4:
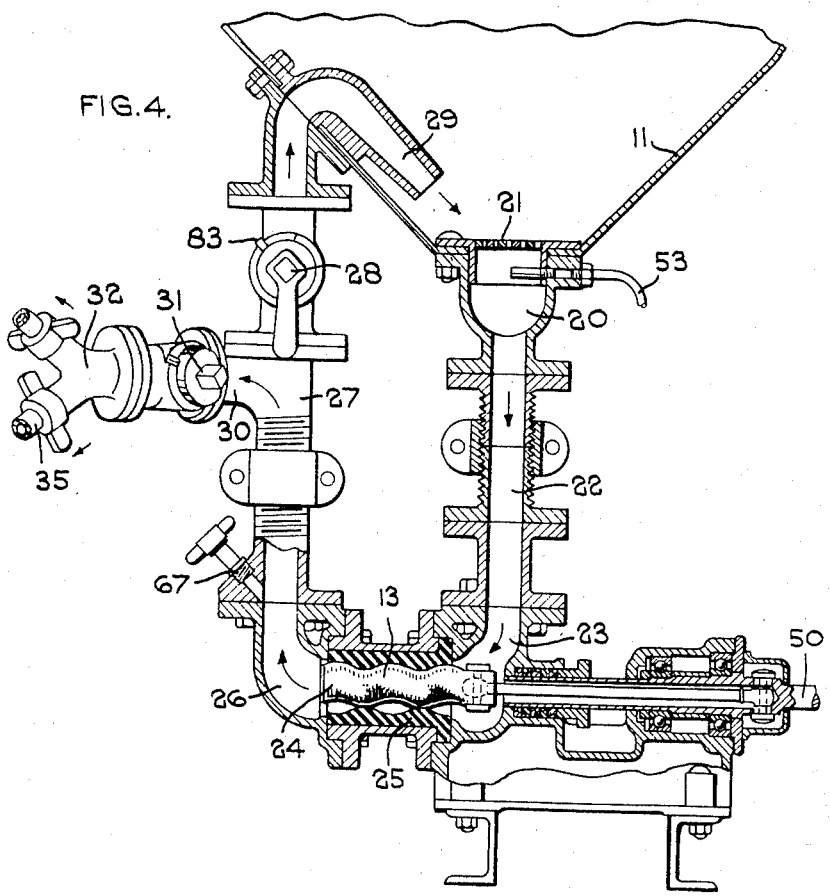
Figure 4 is an enlarged detailed cross sectional view of part of the apparatus shown in Figure 2.

The container has an outlet 20 at its lower end indicated more particularly in Figure 4, the outlet being covered by a perforated grid 21 which retains any large lumps of material therein, and this outlet 20 communicates through the pipe connections 22 with the inlet port 23 of the circulating pump 13.

The solid constituents of the composition to be applied, more particularly the sand, are of an abrasive nature so that a special form of circulating pump is necessary.

The preferred form of pump which is shown in the drawings is of a known type especially suitable for circulating material of this nature, the construction and operation of which pump is described in British Patent Specification No. 400,508, and the pump consists essentially of an elongated rotor 24 and an elongated stator 25 in which the rotor works, which two elements are shaped helically on their operating surfaces as is described in the specification aforesaid.

The stator is of an elastic material such as rubber, while the rotor is rigid and may be made of hardened steel. One element of the pump has one more helical thread than the other (which element in the construction illustrated is the rotor 24), and the arrangement is such that as the rotor turns upon its axis, any given cross section thereof travels back and forth across the corresponding section of the stator, pockets of semi-liquid composition of corresponding size and shape being thereby progressively displaced endwise of the stator in a positive manner, i. e. from the inlet port 23 of the pump to the outlet port 26 thereof.

The outlet port 26 is connected by further pipe connections 27 in which is included a mixing circuit control valve 28 to a supply orifice 29 which extends through the side wall of the container so that there is provided a completely closed circuit in which the ingredients can be mixed, such circuit being constituted by the container 11, the pipe connections 22 and 27, and the pump 13. The orifice 29 is directed downwardly towards the outlet opening 20 of the container 11.

The closed mixing circuit aforesaid is provided in the pipe connections 27 between the valve 28 thereof and the pump 13 with a lateral branch 30 having a feeding circuit control valve 31 to which is attached a Y-shaped union 32. From one of the branches of this union a connection is made to a feeding circuit pressure gauge indicated at 34 in Figure 3, and from the other branch extends a flexible composition supply tube 35 which forms part of the feeding circuit.

The other end of this tube is connected to the spray gun 15 which is shown more particularly in Figures 5 and 6.

This spray gun comprises a body 36 having a dependent handle 37, the body being formed internally with a pair of vertically spaced passages, in the upper of which is mounted slidably a mixture discharge valve 38, and in the lower of which is mounted slidably an air discharge valve 39, both valves being controlled by the usual springs and being provided with operating stems 40 and 41 respectively.

Adjacent the seating 42 of the mixture discharge valve the passage containing this valve is provided on opposite sides of the body with mixture supply and discharge ports 43 and 44 which communicate respectively with mixture supply and discharge pipes 43ᵃ and 44ᵃ of curved form, the outer ends of which pipes are connected respectively to flexible mixture supply and discharge tubes 35 and 46.

As above mentioned the tube 35 is connected to the feeding circuit control valve 31 while the end of the tube 46 remote from the spray gun is connected to the upper part of the interior of the container 11 as indicated at 47 in Figure 2.

Thus the two tubes 35 and 46, together with their associated connections to the body of the spray gun form with the ports 43, 44 within the gun, together with the container 11, the pipe connections 22, 27 and the pump 13, the closed feeding circuit aforesaid around which the mixture is circulated continuously during the coating operation.

The head 45 of the mixture discharge valve 38, together with the valve seating 42, is disposed within and adjacent one end of a cylindrical mixing chamber 72, the other end of which is provided with a detachable cap 73 formed with a discharge nozzle 74.

One of the side walls of the mixing chamber 72 is provided with a diametrically disposed passage 75 in which is mounted an adjustable needle valve 76, adjustment of which is effected by rotation of a thumb piece 77 provided on this valve, and this passage 75 communicates through a bore 78 to an air supply passage 79, the supply of air to the passage 75 being controlled by the air discharge valve 41.

The air supply passage 79 is connected to one end of the tube 16 above referred to, which tube, like the tubes 35 and 46, is of flexible construction.

The handle 37 of the spray gun is provided with the usual operating trigger 80 which is connected to an operating arm 81, and the arrangement is such that on depressing the trigger, the arm 81 first engages with the stem 41 of the air discharge valve 39 so as to supply air through the bore 78 and passage 75 into the interior of the mixing chamber 72, while on further movement of the trigger, the stem 49 is engaged so as to open the mixture discharge valve 38 and permit of the mixture flowing into the interior of the chamber, whereupon it is immediately discharged therefrom through the discharge nozzle 74 by the pressure of the air supplied through the passage 75 into the interior of the mixing chamber, the mixture being discharged in a relatively fine state of division in suspension in a high velocity air stream, and the mixture is discharged directly from the spray gun onto the surface to be coated.

Regulation of the velocity of the air stream and of the relative proportions of the air and the mixture discharged can be effected by adjusting the needle valve 76.

The effect of increasing the proportion of the air is to increase the distance through which the mixture can usefully be directed from the spray gun onto the surface to be coated, and such increase results in a simultaneous decrease in the size of the globules discharged onto the surface, thus producing a finer finish, the effect of decreasing the air supply by adjustment of the valve aforesaid being to increase the size of the globules and to produce a coarser coating while simultaneously decreasing the distance through which the material can usefully be discharged from the spray gun onto the surface.

The mixture supply and discharge ports 43, 44 in the body of the spray gun are disposed immediately adjacent to the valve seating 42 so that when the trigger 80 is released so that the mixture is no longer being discharged from the gun, the mixture is continuously circulated through these ports and past the seating 42 so as to maintain the stem free from solid deposit while the apparatus is in use and in between the actual coating operations.

Furthermore, the seating 42 and the head 45 of the mixture discharge valve are both disposed within the interior of the mixing chamber 72 into which the air under high pressure is discharged past the needle valve 76 and this high pressure discharge of the air into the interior of the mixing chamber assists in maintaining the valve seating 42 and the valve head 45 free from depositions of solid matter as well as preventing the accumulation of such depositions on the interior of the mixing chamber walls themselves.

The cap 73 which is provided with the discharge nozzle 74 can be removed from the body of the mixing chamber for cleaning purposes as well as to permit of its substitution by a nozzle of different size or of its replacement by a nozzle formed centrally in a plasterer's float where the apparatus is to be used for plastering walls.

Alternatively, the cap may be replaced by a brush having a central orifice so that the mixture may be discharged onto a wall simultaneously with the roughening of the so formed surface by the bristles of the brush, whereby the adherence of the sprayed mixture to the wall is facilitated.

The spray gun above described can be operated by one hand, the fingers of the hand grasping the handle 37 being free to operate the trigger 80 and the effect of increasing the hand pressure is to depress the trigger and open the valves 38, 39.

For cleaning purposes the curved pipe connections 43a, 44a are provided with aligned openings disposed on opposite sides of the spray gun in alignment with the ports 43, 44 and provided with removable closure members 43b and 44b respectively, and one of these closure members may be removed and replaced by a laterally extending handle which may be grasped by the user's other hand to facilitate control of the spray gun during the coating operation.

The pump 13 already referred to, is provided with a power unit for driving it, indicated at 48, from which a belt drive is taken to a main driving pulley 49 on a shaft 50 which drives the pump rotor, and from the main driving pulley is taken a second drive to an air compressor 51, the receiver of which is indicated at 52.

Mixing of the ingredients is effected by their circulation around the mixing circuit aforesaid, but for assisting in maintaining the ingredients fully mixed, the connection 14 aforesaid is made from the air receiver 52 through the pipe 53 to the outlet 20 of the container 11 at a position therein immediately beneath the perforated grid 21, which pipe 53 is provided with an air control valve 54, so that air under pressure is supplied to the mixing circuit 82.

Such air serves to form a large number of very small bubbles in the material within the mixing circuit, which bubbles serve to maintain separate the individual particles of sand, and enable them to be effectively coated with the cement so that when the coated sand particles are applied to the wall, they will rapidly and effectively adhere thereto and to one another so as to form a strong durable coating.

Furthermore, by introducing air under pressure into the mixing circuit so as to form a large number of minute air bubbles therein, the air bubbles assist in maintaining the coated sand particles in suspension in the water, so that the composition is maintained fully mixed, and by introducing the air into the mixing circuit at a position immediately below the discharge orifice from the container 11, the air is discharged upwardly from the end of the pipe 53 through the grid 21 and through the composition contained within the lower part of the container, the air being discharged therethrough at relatively high velocity thereby maintaining the contents of the container 11 effectively mixed and facilitating their mixture by their passage around the mixing circuit.

From the receiver 52 a connection 55 is made to a gauge 56 for reading the air pressure in the receiver, while a further connection 57 is made through an air pressure control valve 58 to the tube 16 aforesaid for supplying the air under pressure to the gun 15, which tube communicates with a further gauge indicated at 38.

If desired, the apparatus may be provided further with a preliminary mixing device comprising a rectangular vessel 60 mounted on the chassis at one side of the body 18 and provided internally with paddles 61 mounted on the horizontal shaft 62, which shaft may be connected through the clutch 63 operated from the lever 59 to a belt drive from the main driving pulley 49.

The vessel 60 is provided with a removable airtight lid 64 and provision is made for supplying air under pressure to the upper part of the vessel through the pipe 65 provided with the valve 66, the pipe 65 being connected to the receiver 52.

The base of the vessel 60 is connected to the interior of the container 11 through mixture transfer pipe 67 provided with transfer control valve 68, the mixture being transferred from the vessel 60 to the container 11 by opening the two valves 66 and 68 so that the mixture is transferred by the pressure of the air admitted to the upper part of the vessel 60.

In using the apparatus constructed as above described for coating building walls with cement composition for receiving stucco, an equal volume of cement and water is taken and subjected to a preliminary mixing operation within the vessel 60.

The mixture is now transferred from the vessel 60 to the container 11 by opening the two valves 66 and 68 in the manner described, whereupon the two valves are closed and a further quantity of cement and water may be supplied to the vessel 60 and subjected to a preliminary mixing operation.

With the mixture now within the container 11, the feeding circuit control valve 31 is closed and the mixing circuit control valve 28 is fully opened.

The mixture immediately commences to circulate within the mixing circuit 82 consequent on the operation of the pump 13 from the power unit 48, the material passing down the pipe connections 22 and up the pipe connections 27 as indicated by the arrows in the drawing. Such circulation serves to effect mixing of the cement and water additional to that obtained within the vessel 60.

The valve 54 in the pipe 53 is now opened so as to admit air under pressure from the receiver 52 to the container outlet 20, the air rising through the contents of the lower part of the container at a comparatively high velocity and in a direction opposite to the direction of flow of the material in the mixing circuit so that complete admixture of the cement and water is now effected.

A quantity of sand by volume equal to that of the cement is now added to the mix in the container, and after further mixing for a period which may be of the order of 5 to 10 minutes, the mixture is tested for uniformity in the known manner, and after mixing is complete, the valve 54 is closed completely to cut off the air. By this time the sand particles are separated from one another and completely coated with cement, and the water contains a very large number of minute air bubbles introduced by the admission of air under pressure into the mixing circuit as above described, which air bubbles, after the closure of the valve 54, serve to maintain the coated sand particles in suspension in the water.

As a preliminary to the actual coating operation, the mixing circuit control valve 28 is now closed partially, and the feeding circuit control valve 31 opened until sufficient pressure for adequate feeding of the material through the feeding circuit is read on the gauge 34.

Thus a predetermined proportion of the final mixture within the mixing circuit is now circulated continuously by the pump 13 around the feeding circuit above referred to, which proportion can be varied by adjusting the valves 28 and 31.

The valve 58 for controlling the air supply to the spray gun is also opened, and the material which is now circulated continuously around the feeding circuit including the gun can now be sprayed by the spray gun operator onto the surface to be coated as required.

By circulating the mixture continuously simultaneously with its spraying onto the surface to be coated, blockage of the tubes 35, 46 and of the spray gun by settlement therein of the solid constituents of the mixture is avoided and the composition is maintained at the requisite degree of mixing for coating the surface.

The valve 54 is opened from time to time so as to maintain fully aerated the mixture within the mixing circuit including the container by maintaining fully suspended in the water the coated sand particles.

It is necessary that the air pressure supplied through the tube 16 to the gun should be higher than the pressure within the feeding circuit, otherwise the material might flow from the latter through the gun back into the air tube 16. A convenient air pressure is 60 lbs. per square inch, and a convenient pressure to employ in the feeding circuit is 20 lbs. per square inch.

The composition is discharged at high velocity from the spray gun and in suspension in the air on other gas likewise discharged at high velocity from the gun so that the composition is applied rapidly and relatively uniformly to the surface.

The fineness of the spray discharged from the gun can be varied in accordance with the requirements of the surface to be coated by varying the air pressure supplied to the gun relative to the pressure within the feeding circuit. By increasing the air pressure in relation to the pressure within the feeding circuit, a finer spray is obtained, a reverse operation enabling a coarser spray to be applied to the surface.

In order to prevent the mixing circuit from becoming choked by settlement of the solid constituents of the mixture, the mixing circuit control valve 28 is provided with a stop 83 for preventing this valve from being fully closed and thus ensuring that some composition is always circulating around the mixing circuit as well as to assist in maintaining the desired degree of admixture of the constituents of the composition.

A similar stop may be provided also on the valve 31 controlling the feeding circuit, thus ensuring that the mixture is continuously flowing through the spray gun even when the valves thereof are closed and the composition is not being discharged from the gun. Thus the mixture is continuously circulated through the tubes 35 and 46 and blockage thereof by settlement therein of the solid constituents of the composition is avoided.

Free flow of the composition around the mixing circuit with the valve 28 in the partially closed position as well as when the valve is fully opened is facilitated by the fact that the length of the mixing circuit is short and substantially less than the length of the feeding circuit, while the mixing circuit has a cross section which in general is substantially greater than the cross section of the feeding circuit provided by the tubes 35 and 46.

Nevertheless, the cross section of the tubes 35 and 46 is made relatively large so that even with the valve 40 of the gun fully open, a proportion of the composition still returns along the tube 46 back to the container 11, thus preventing settlement of the solid constituents in the tube 46 and consequent choking.

After the conclusion of the coating operation the flexible tubes 35 and 46 are washed out with water, while if the apparatus is going to be out of use for an appreciable time, the mixing circuit may also be washed out with water by admitting water thereto under pressure through the connection 69 shown in Figure 4.

Although there is shown only one spray gun in the main circuit, a number of spray guns may be provided in series in the one feeding circuit so that the composition passes through the chamber 39 of each gun in turn, a proportion thereof being discharged from each gun as it passes therethrough.

With the apparatus as so far described, the tubes 35, 46 and 16 leading to the spray gun may be of a substantial length, but where it is desired to spray the composition at a position which is considerable distance from the apparatus, the main circuit may include by by-pass indicated at 70 in Figure 7, which by-pass is provided with a control valve 71, and the connections between the by-pass 70 and the container 11 are of an internal cross section greater than that of the tubes 35 and 46 so that only a proportion of the mixture being circulated by the pump would reach the spray gun, such an arrangement reducing the possibility of the mixture clogging the flexible tubes where the gun is situated a considerable distance from the rest of the apparatus.

Figure 1:
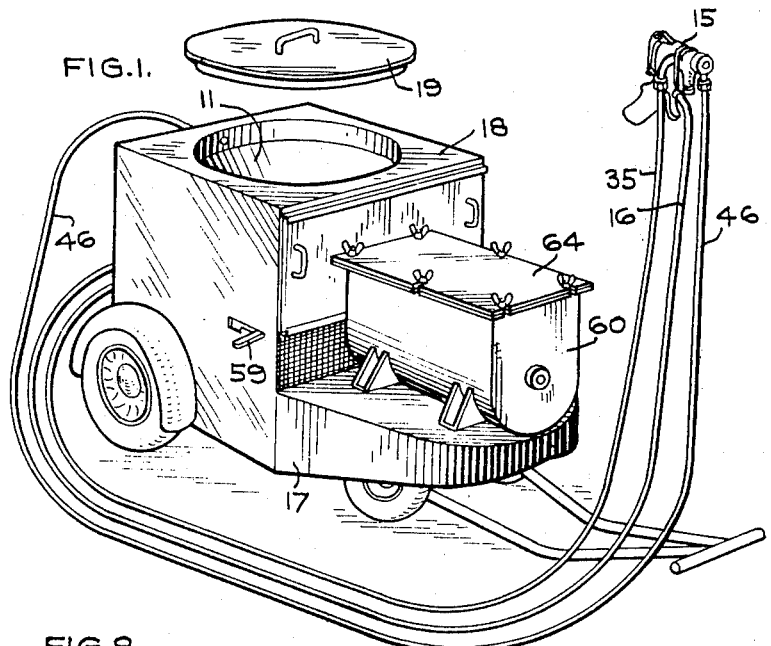
Figure 1 is a perspective view of one form of apparatus for coating walls of buildings with cement, mortar or plaster in accordance with this invention.
Figure 8:
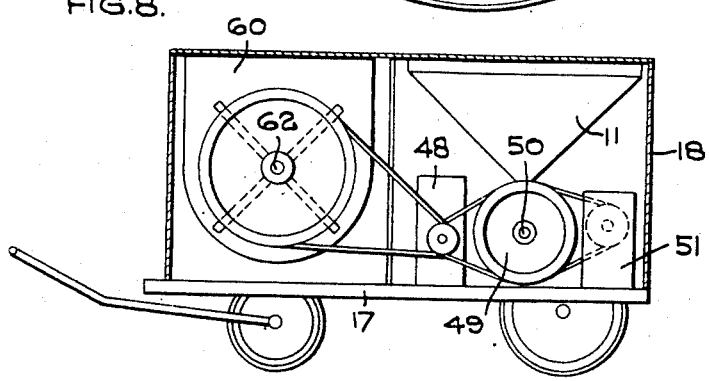
Figures 8 and 9 are longitudinal side elevations and part sectional plan views illustrating a slight modification of the apparatus shown in Figure 1.
Figure 9:
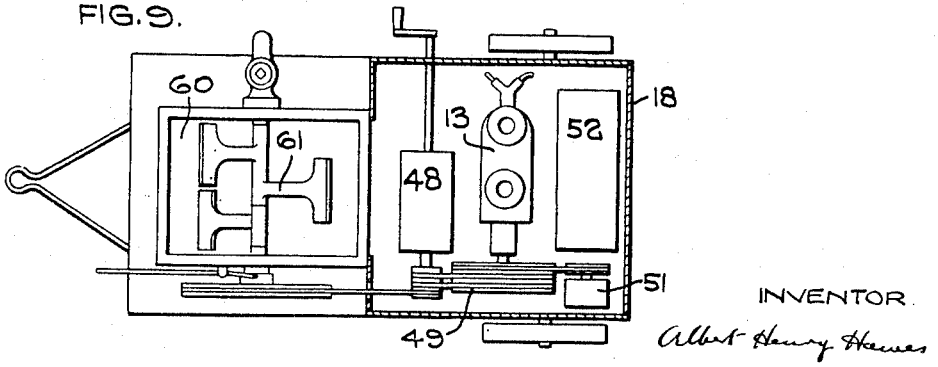

In Figures 8 and 9 depicted a slightly modified form of apparatus in which the relative disposition of the mixing vessel 60, power unit 48, compressor 51 and pump 13 are changed somewhat as will be apparent from these figures, but the remaining features of the apparatus and the mode of operation is the same as that already described.

If desired, known substances may be added to the mixture for the purpose of increasing the wetting power of the water, thereby enabling the total volume of added water to be reduced.

Although the mode of operation has been described in connection with the coating of building walls with cement for receiving stucco, it should be understood that the process would be carried out in the same way in coating any other composition of the kind already specified, suitable alteration being made to the proportion and nature of the ingredients. Furthermore, the composition may include only one, or a plurality of solid constituents.

With all of the forms of the process and apparatus described, it will be further understood that the composition is discharged directly from the circuit onto the surface to be coated, and it is an essential feature of the invention that the means for discharging the composition onto the surface is directly adjacent to the circuit around which the composition is circulating.

By providing in addition to the closed feeding circuit a closed mixing circuit in which final mixture is effected, together with means for circulating a predetermined proportion of the final mixture around the feeding circuit, considerably more effective mixture of the composition can be effected than would be possible if only a closed feeding circuit were provided. No substantial resistance to flow is afforded by the mixing circuit by reason of the length thereof, which length is substantially less than that of the feeding circuit, while since the mixing circuit does not serve to circulate the mixture past the feeding position, the mixing circuit may have a cross section which in general is substantially greater than the convenient maximum cross section of the feeding circuit. Thus, adequate final mixture of the composition can be effected by circulating the material around the mixing circuit right up to the time that discharge of the material onto the surface to be coated is commenced, while during such discharge adequate mixture of the composition can be maintained by continued circulation of a proportion of the composition around the mixing circuit. As a result clogging of the apparatus by the solid constituents of the composition during the actual use of the apparatus is avoided.

The present invention provides therefore a process and apparatus for rapidly coating surfaces with compositions of the kind specified and in which clogging of the appartus by the settling out of the solid constituents causing stoppage of the process is avoided.

Obviously, instead of using air for spraying the composition from the spray gun and for assisting in effecting admixture of the composition, any other suitable gas may be used.

What I claim then is:

1. Apparatus for coating surfaces with compositions of the kind specified, comprising a reservoir for said composition, a spray gun for spraying the composition onto the surface to be coated, said spray gun having a bore therein extending therethrough from opposite sides of said spray gun, a pair of pipes each connecting said reservoir one to one end of and the other to the other end of said spray gun bore and forming with said bore and reservoir a closed circuit for said composition, means for circulating said composition continuously around said circuit, said spray gun including a mixing chamber, a nozzle at one end of said mixing chamber for discharging the composition from the spray gun, a displaceable valve member and a seating for said valve member at the opposite end of said chamber adapted to control the flow of composition from said bore to said mixing chamber, said valve member and seating being immediately adjacent to and extending into said bore, said bore communicating with said mixing chamber, means for supplying gas under pressure to said mixing chamber of said spray gun, valve means for controlling said supply, and means controllable by the operator for actuating said valve member and valve means.

2. Apparatus for coating surfaces with compositions of the kind specified, comprising a reservoir for said composition, a spray gun for spraying the composition onto the surface to be coated, said spray gun having a bore therein extending therethrough from opposite sides of said spray gun, a pair of pipes each connecting said reservoir one to one end of and the other to the other end of said spray gun bore and forming with said bore and reservoir a closed circuit for said composition, means for circulating said composition continuously around said circuit, said spray gun including a mixing chamber of substantially cylindrical form, a nozzle at one end of said mixing chamber for discharging the composition from the spray gun, a displaceable valve member and a seating for said valve member at the opposite end of said chamber adapted to control the flow of composition from said bore to said mixing chamber, said valve member and seating being immediately adjacent to and extending into said bore, said bore communicating with said mixing chamber, said gun including a gas supply passage extending into said mixing chamber intermediate the ends thereof, means for feeding gas under pressure to said gas supply passage, valve means for controlling the supply of gas to said mixing chamber and means controllable by the operator for actuating said valve member and valve means.

3. Apparatus for coating surfaces with compositions of the kind specified, comprising a reservoir for said composition, a spray gun for spraying the composition onto the surface to be coated, said spray gun having a bore therein extending therethrough from opposite sides of said spray gun, a pair of pipes each connecting said reservoir one to one end of and the other to the other end of said spray gun bore and forming with said bore and reservoir a closed circuit for said composition, means for circulating said composition continuously around said circuit, means for supplying gas under pressure to said circuit, said spray gun including a mixing chamber, a nozzle at one end of said mixing chamber for discharging the composition from the spray gun, a displaceable valve member and a seating for said valve member at the opposite end of said chamber adapted to control the flow of composition from said bore to said mixing chamber, said valve member and seating being immediately adjacent to and extending into said bore, said bore communicating with said mixing chamber, means for supplying gas under pressure to said mixing chamber of said spray gun, valve means for controlling said supply, and means controllable by the operator for actuating said valve member and valve means.

4. Apparatus for coating surfaces with compositions of the kind specified, comprising a reservoir for said composition, a spray gun for spraying the composition onto the surface to be coated, said spray gun having a bore therein extending therethrough from opposite sides of said spray gun, a pair of pipes each connecting said reservoir one to one end and the other to the other end of said spray gun bore and forming with said bore and reservoir a closed circuit for said composition, means for circulating said composition continuously around said circuit, a nozzle on said spray gun for discharging the composition from the gun, said spray gun including a mixing chamber extending from said nozzle to said bore transversely of the length of said bore, said bore communicating with said mixing chamber, an annular valve seating extending between said bore and said mixing chamber, a valve member adapted to engage with said seating to close the communication between said bore and said mixing chamber, said valve member extending across said bore and being operable from the side thereof opposite to said mixing chamber, means for supplying gas under pressure to said mixing chamber of said spray gun, valve means for controlling said supply, and means controllable by the operator for actuating said valve member and valve means.

5. In apparatus for coating surfaces with compositions of the kind specified and comprising a closed circuit around which the composition is circulated continuously, the provision in said circuit of a spray gun for spraying the composition onto the surface to be coated, said spray gun having a bore therein extending therethrough from opposite sides of said spray gun and forming part of said closed circuit, said spray gun including a mixing chamber, a nozzle at one end of said mixing chamber for discharging the composition from the spray gun, a displaceable valve member and a seating for said valve member at the opposite end of said chamber adapted to control the flow of composition from said bore to said mixing chamber, said valve member and seating being immediately adjacent to and extending into said bore, said bore communicating with said mixing chamber, means for supplying gas under pressure to said mixing chamber of said spray gun, valve means for controlling said supply, and means controllable by the operator for actuating said valve member and valve means.

6. In apparatus for coating surfaces with compositions of the kind specified and comprising a closed circuit around which the composition is circulated continuously, the provision in said circuit of a spray gun for spraying the composition onto the surface to be coated, said spray gun having a bore therein extending therethrough from opposite sides of said spray gun, and forming part of said closed circuit, a nozzle on said spray gun for discharging the composition from the gun, said spray gun including a mixing chamber extending from said nozzle to said bore transversely of the length of said bore, said bore communicating with said mixing chamber, an annular valve seating extending between said bore and said mixing chamber, a valve member adapted to engage with said seating to close the communication between said bore and said mixing chamber, said valve member extending across said bore and being operable from the side thereof opposite to said mixing chamber, means for supplying gas under pressure to said mixing chamber of said spray gun, valve means for controlling said supply, and means controllable by the operator for actuating said valve member and valve means.

ALBERT HENRY HAWES.

REFERENCES CITED

The following references are of record in the file of this patent:

UNITED STATES PATENTS

| Number | Name | Date |
|---|---|---|
| 931,030 | Bowman | Aug. 17, 1909 |
| 1,995,414 | Blanken | Mar. 26, 1935 |
| 2,013,370 | Tygart | Sept. 3, 1935 |
| 2,022,481 | Schellenger | Nov. 26, 1935 |
| 2,048,912 | Liska et al. | July 28, 1936 |
| 2,123,604 | Johnson | July 12, 1938 |
| 2,236,737 | Stone | Apr. 1, 1941 |
| 2,244,686 | Garrison et al. | June 10, 1941 |
| 2,366,150 | Yount | Dec. 26, 1944 |
| 2,378,184 | Carlson | June 12, 1945 |
| 2,488,089 | Mayo | Nov. 15, 1949 |
| 2,565,696 | Moller et al. | Aug. 28, 1951 |

FOREIGN PATENTS

| Number | Country | Date |
|---|---|---|
| 957,464 | France | Aug. 22, 1949 |